United States Patent [19]

Jamison

[11] Patent Number: 5,439,735

[45] Date of Patent: Aug. 8, 1995

[54] METHOD FOR USING SCRAP RUBBER; SCRAP SYNTHETIC AND TEXTILE MATERIAL TO CREATE PARTICLE BOARD PRODUCTS WITH DESIRABLE THERMAL AND ACOUSTICAL INSULATION VALUES

[76] Inventor: Danny G. Jamison, 11841 Antietam Rd., Woodbridge, Va. 22192

[21] Appl. No.: 830,840

[22] Filed: Feb. 4, 1992

[51] Int. Cl.$^6$ .......................... B29C 43/00; B32B 7/00
[52] U.S. Cl. .................... 428/255; 428/273; 428/325; 428/903.3; 264/37; 264/122; 264/DIG. 69
[58] Field of Search ............... 264/DIG. 69, 109, 122, 264/37; 428/903.3, 255, 273, 325; 521/43.5

[56] References Cited

U.S. PATENT DOCUMENTS

| | | | |
|---|---|---|---|
| 3,801,421 | 4/1974 | Allen et al. | 428/903.3 |
| 3,880,975 | 4/1975 | Lundmark | 264/119 |
| 3,916,059 | 10/1975 | Molloy et al. | 428/298 |
| 3,948,009 | 4/1976 | Bernhard | 428/903.3 |
| 3,969,459 | 7/1976 | Fremont et al. | 264/109 |
| 4,039,645 | 8/1977 | Coyle | 264/118 |
| 4,110,397 | 8/1978 | Wooler | 264/338 |
| 4,127,636 | 11/1978 | Flanders | 264/113 |
| 4,174,308 | 11/1979 | Disanto | 260/2.3 |
| 4,244,841 | 1/1981 | Frankland | 260/2.3 |
| 4,479,912 | 10/1984 | Bullock | 264/23 |
| 4,565,662 | 1/1986 | Mansson et al. | 264/113 |
| 4,851,500 | 7/1989 | Lalwani et al. | 528/437 |
| 5,094,905 | 3/1992 | Murray | 428/218 |
| 5,106,554 | 4/1992 | Drews | 264/112 |

OTHER PUBLICATIONS

Committee On Small Business, U.S. House of Representatives, Hearing, Ser. No. 101-52, Apr. 18, 1990, pp. 1-2, 51.

Introduction To Natural and Synthetic Rubbers, by D. W. Huke, 1961, p. 77.

Architectural Graphic Standards, Editor–John Ray Hoke, Jr., 1988, p. 748.

*Primary Examiner*—Allan R. Kuhns

[57] ABSTRACT

A method for recycling rubber scrap to yield a final product of various thicknesses and various widths and lengths capable of consolidation into a variety of building product materials. Particle boards including scrap rubber, with or without synthetic and/or textile fibers composition, of the present invention are characterized by high strength, fire resistance, water and rot resistance, and display favorable thermal and acoustical insulation qualities. Adhesives, strengtheners, and fire retardants are mixed with rubber scrap, with or without synthetic or textile fibers, and introduced into molds; or an apparatus system for the continuous production of scrap rubber products; where heat, pressure, with or without ultrasonic sound, is introduced to produce the final product. The amount of chemicals and/or other components to be added to the composite mixture will vary according to the desired result in each of the specified categories characterized by strength and fire resistance. Extremely high properties of surface water and rot resistance are a resultant of the natural properties of rubber. Thermal and acoustical insulation efficiencies are governed by the thickness of the final product.

10 Claims, No Drawings

METHOD FOR USING SCRAP RUBBER; SCRAP SYNTHETIC AND TEXTILE MATERIAL TO CREATE PARTICLE BOARD PRODUCTS WITH DESIRABLE THERMAL AND ACOUSTICAL INSULATION VALUES

BACKGROUND OF THE INVENTION

1. Field of Invention

The present invention relates to a method for recycling rubber scrap, primarily scrap tire carcasses reduced to particles of various sizes and geometrical configurations, tire tread buffings, ground rubber dust, synthetic or textile fibers used in the production of rubber products, or other scrap rubber; to obtain final recycled rubber products of various defined thicknesses, widths, and lengths. The method is characterized by its use of ingredients which are intimately mixed, formed in a mold and submitted to pressure, steam, and cooled; or by production on an automated assembly line where scrap rubber particles, with or without synthetic or textile material, are fed by a apparatus system for the continuous production of scrap rubber products. Products formulated according to this invention are suitable for a variety of uses as elements in building construction such as a subfloor construction material, exterior or interior wall construction material, ceiling construction material, subroof construction material, etc.; and display favorable thermal and acoustical insulation properties.

2. Background of the Invention

D. W. Huke states that most reclaimed rubber is obtained from tires, and that this rubber is treated so that it can be re-milled and incorporated into a rubber mix. D. W. Huke, INTRODUCTION TO NATURAL AND SYNTHETIC RUBBERS at 77 (1961). Virtually all the prior art literature concerning reclaiming rubber and methods for reclaiming concern themselves with obtaining a "de-vulcanized" product for use as a filler, additive, or extender in subsequent manufacturing operations. Testimony during the U.S. House of Representatives Committee on Small Business hearings on H. R. 4147. The Tire Recycling Incentives Act, emphasized that about 279 million used rubber tires are venerated in the United States annually. About 2.5 to 3 billion used tires litter landscapes and landfills across the United States. Most recycled scrap rubber tire material is manufactured into tires, recreational surfaces such as running tracks and tennis courts, and added to asphalt used for road pavement and other road products.

A method for recycling rubber scrap with foreign material such as textile fibers or metal removed, and rubber scrap ground to a substantially uniform size of a dry, sand-like consistency to yield final products such as highway guard rail extensions, railroad tie pads, paving "stones", and floor coverings of at least about one inch in thickness is disclosed in U.S. Pat. No. 4,244,841 to Frankland. U.S. Pat. No. 4,851,500 to Lalwani et al describes a process for making roofing products such as rolled roofing, tiles, shakes, slates, and walkway pads.

A method for forming foamed thermal insulating material from scrap rubber is disclosed in U.S. Pat. No. 4,174,308 to DiSanto. U.S. Pat. No. 4,039,645 to Clovis discloses a process for the manufacture of fire retardant particle board composed of wood particles.

Numerous methods and processes for fiber board and particle board are known in the prior art. U.S. Pat. No. 4,127,636 to Flanders discloses a process for making a reinforced board from lignocellulosic particles in which comminuted lignocellulosic particles, binders and other additives and additionally a plurality of elongate reinforcing filaments comprising a plurality of short filaments such as glass fibers or steel wires are distributed uniformly throughout the particle and binder mixture in a random orientation so as to extend generally in all directions. The lignocellulosic particles utilized are woody particles such as sawdust, bark, etc. but the resultant product can also employ any fibrous lignocellulosic material including various grain and vegetable products such as corn stocks. U.S. Pat. No. 3,916,059 to Molloy et al discloses crossbanding sheets which are made of a combination of glass fibers and cellulose fibers held together by a synthetic resin binder extending throughout the sheet, the fibers of the crossbanding sheets are oriented in a direction perpendicular to the direction of orientation of wood chips or grain of wood core. The sheets comprise a combination of glass fibers and cellulose fibers. U.S. Pat. No. 3,880,975 to Lundmark discloses a thin, continuous web produced from a starting material containing at least a major part of defibrated lignocellulose plant substance and a mixture of resinous binding agents. In addition to lignocellulose fibers and resin binders, the starting material may include mineral fibers including asbestos, glass and rockwool fibers; animal textile fibers, and vegetable textile fibers. Fibers were impregnated with amounts of moisture repellants, fire retarders, fungicides, insect repellants, etc. U.S. Pat. No. 4,110,397 to Wooler discloses an improvement in the molding process for composite bodies of sheets, especially those from lignocellulosic material in which an isocyanate binding agent is used. That patent defines lignocellulosic material as wood chips, wood fibers, straw, dried brushes, reeds, and grasses and may further include ground nuts and hulls from cereal crops. U.S. Pat. No. 4,565,662 to Mansson et al discloses a method for the production of particle boards by addition of a hydrophobing agent and a curable glue to wood based particles, shaping of the particle mass and subsequent curing of the glue by application of pressure and heat.

It is therefore apparent that there is a great need in the art for a method of manufacturing particle board of reclaimed or recycled rubber as taught in the prior art. Furthermore, it is also desirable that any such method would be sufficiently variable so as to provide building product materials having favorable thermal and acoustical insulation properties; and that such building product materials be manufactured of varying sizes, shapes, thicknesses, and degrees of hardness; and such particle boards be manufactured from scrap rubber, with or without synthetic or textile fibers. That is the subject matter of this patent.

SUMMARY OF THE INVENTION

The principal object of the present invention relates to a method for producing a unique fire retardant particle board composed of scrap rubber, and may include synthetic or textile fibers, which are converted to finished and useful products by application of heat, pressure, and chemicals which induce physicochemical changes to the mixture. Unlike fiber or particle board of lignocellulosic woody or fibrous vegetable material, rubber scrap does not decay and has extremely high properties of water and rot resistant. Furthermore, rubber scrap is naturally insect resistant. The particle board product composed of scrap rubber is an ecologically attractive replacement for lignocellulosic material which is cultivated, harvested, and processed for the manufacturing of wood products and material such as particle board. The final particle board product composed primarily of scrap rubber offers greater thermal resistance and greater acoustic insulation for noise reduction over lignocellulosic material normally used in building products; and over most materials used in building construction for thermal and acoustic insulation.

DETAILED DESCRIPTION OF THE INVENTION

The improved procedures and products of this invention are produced in accordance with the procedures which are well described in, for example, U.S. Pat. No. 4,244,841 to Frankland for a method for recycling rubber, and U.S. Pat. No. 3,969,459 to Fremont et al for a process and apparatus system for the continuous production of fiberboard, whose disclosures are specifically incorporated herein by reference. The significant departures from such procedures being the use of scrap rubber, synthetic and/or textile scrap of various sizes and geometrical configurations; use of fire retardant; use of reinforcing agent; and use of deodorant. A variant product formed by this invention is a particle board of various dimensions composed of primarily recycled or reclaimed scrap rubber collected from our everyday environment which has very high qualities of decay, water, and rot resistance (and therefore not biodegradable and becomes an environmental hindrance if not danger when left in landfills); and which has greater thermal resistance and noise reduction values than lignocellulosic and fibrous materials used for particle board manufacturing and subsequent application in the building construction industry.

As is well recognized in the art, the majority of particle board manufacturing operations apply lignocellulosic and fibrous materials to manufacture particle boards for use as building construction products. Uncontaminated rubber scrap is ground to sand like consistency and used to fabricate products such as highway guard rails extension blocks. Critical features of the present invention are that particle boards which are composed of rubber scrap from tire carcasses and other sources in the form of rubber, synthetic or textile particles (such as nylon and rayon used in the making of rubber products) are of irregular shapes and assorted sizes and overlap one another; and a solidifying binder combined with fire retardant, reinforcing agent, and deodorant uniformly filling the interstices among the particles. The particles are integrally bonded to one another in sheet form by application of heat and pressure. Utilization of the critical features in accordance to the invention gives rise to a number of advantages compared to the current states of the art hitherto used in production of particle board and of recycled rubber products. For example, production of scrap rubber particle board of the present invention is ecologically desirable by utilizing discarded tire carcasses and scrap rubber which do not decay or biodegrade in landfills, cityscapes, and landscapes of our world community. Decay-proofing and insect-proofing agents are not required for particle board manufactured from scrap rubber, but often are needed for building construction materials using particle board manufactured from lignocellulosic and fibrous materials. Extreme fire hazard of particle board manufactured of lignocellulosic and fibrous materials is reduced by the natural properties of rubber combined with a fire retardant. Further, properties of mass and absorption displayed by particle board manufactured from rubber scrap create favorable thermal insulation and noise reduction values over particle boards manufactured from lignocellulosic and fibrous materials.

Materials utilized in particle board construction will remain the same, but with variations in quantities of material used depending on desired results.

Example 1

Intimately mix together rubber maker's sulphur; zinc stearate; deodorant; fire retardant composed of, for example, borate and sulfuric acid; and a reinforcing agent of carbon black to prepare a cure mix. Add the cure mix to scrap rubber which may contain nylon, rayon, and other synthetic and fiber threads. Next place the cure mix and scrap rubber mixture in molds. Times, pressures, and temperatures to effect a cure and other variances in the final product are appropriate as specified in U.S. Pat. No. 4,244,841 to Frankland. Increase hardness of the final product by increasing the percentage of sulfur and/or carbon black in the cure mix.

Example 2

Instead of additional amounts of sulfur and/or carbon black used in Example 1, one or several layers of glass fiber mesh of a proportional size to the final product is introduced to molds or the continuous process to add physical reinforcement strength to the final product. Otherwise, the same procedure as in Example 1 is repeated.

Example 3

Instead of glass fiber mesh specified in Example 2, one or more layers of metal mesh is introduced into molds or the continuous process to add physical reinforcement strength to the final product. Otherwise, the same procedure as in Example 1 is repeated.

Example 4

Instead of glass fiber mesh specified in Example 2, fiberglass strands of random lengths are introduced into molds or the continuous process and incorporated into the final product to add physical reinforcement strength. Otherwise, the same procedure as in Example 1 is repeated.

Example 5

Problems in the performance of building construction materials are frequently associated with the undesirable flow of heat, moisture, or both. The solution to the basic problem of material performance involves the incorporation of enough insulation within the building to reduce the inward or outward heat flow to the desired rate. Table 1 condensed from J. Hoke, ARCHITECTURAL GRAPHIC STANDARDS, 8th Edition, at 748, presents selected R values (resistance to heat flow through a material) for several construction products. Rubber provides better thermal insulation than any common building product used to insulate or construct outside walls or roofs in the current art of building construction.

TABLE 1
THERMAL VALUES OF MATERIALS

| MATERIAL | R-VALUE PER INCH OF THICKNESS |
| --- | --- |
| Plywood | 0.04 |
| Cement Mortar | 0.20 |
| Particle Board | ~1.31 |
| Wood Fiberboard | 2.00 |
| Cement Fiber Slabs | 2.00 |
| Vermiculite | 2.27 |
| Fiberboard Sheathing | ~2.64 |
| Acoustical Tile | 2.70 |
| Cellular Glass | 2.86 |
| Mineral Fiberboard-Roof Insul | 2.94 |
| Wood Fiber, Softwoods | 3.33 |
| Polystyrene Molded Beads | 3.85 |
| Glass fiber | 4.00 |
| Rockwool | 4.16 |
| EXPANDED RUBBER (RIGID) | 4.55 |

Example 6

A natural property of rubber is its ability to dissipate vibration shock because of the soft, resilient nature of rubber. Viscoelastic materials such as rubber and other insulators dampen vibration of rigid panels composed of gypsum board or plywood which transmit sound; and viscoelastic materials attenuate airborne sound by dampening out by friction the air molecules stimulated by the amplitude of the acoustical vibration. The resulting friction acts as an acoustical resistance which decreases the flow of acoustical vibrations. Rubber is an effective block for environmental noise such as auto, rail, and air traffic; musical; human voice; machine; and equipment noise. Acoustical insulation efficiencies increase with (a) mass—lighter weight materials do not block sound well; with (b) separation—improved efficiencies without undue increase of mass is achieved by separating materials. Attenuation of sound increases about 5 decibels for every doubling of the airspace, with minimum effective space being approximately 2 inches; and (c) absorption—soft, resilient materials such as rubber increase the reduction of sound transmission by dampening or restricting vibration of the sound wave.

The foregoing is considered as illustrative only of the principles of the invention. Further, since numerous modifications and changes will readily occur to those skilled in the art, it is not desired to limit the invention to the exact composition as described under the detailed description of the invention. It is obvious to one skilled in the art, that the invention can also be applied to continuous forming operations incorporating an apparatus system for the continuous production of scrap rubber products wherein heat, pressure, with or without ultrasonic sound, is introduced to produce the final product. Accordingly, all suitable modifications and equivalents may be resorted to, falling within the scope of this invention.

What is claimed is:

1. A method for recycling scrap rubber which may contain synthetic and/or textile material to manufacture rigid sheet material of various thicknesses and various widths and various lengths capable of consolidation into a variety of building material products; said method comprising steps of:
   a. preparing a cure mix of rubber maker's sulfur; zinc stearate; deodorant; fire retardant; and carbon black;
   b. admixing of said cure mix with scrap rubber of various sizes and geometrical configurations, with or without said synthetic and/or textile scrap material;
   c. placing the resulting mixture into a mold;
   d. closing said mold and compressing said mixture to the desired thickness of said sheet material;
   e. placing said mold into a steam autoclave and maintaining steam pressure within said autoclave to effect a cure, and
   f. removing said sheet material from said autoclave and mold to effect cooling.

2. The method of claim 1 wherein the preparation, mixing, molding, compressing, and curing steps are all done continuously.

3. The method of either claim 1 or claim 2 wherein glass fiber mesh of a proportional size to the final product is introduced to the molds or the continuous method to add physical reinforcement strength to the final product.

4. The method of either claim 1 or claim 2 wherein metal mesh is introduced to the molds or the continuous method to add physical reinforcement strength to the final product.

5. The method of either claim 1 or claim 2 wherein glass fiber strands of random lengths are introduced into the molds or the continuous method and incorporated into the final product to add physical reinforcement strength.

6. A rigid sheet material comprising a mixture of scrap rubber of various sizes and geometrical configurations, with or without synthetic and/or textile scrap material and a cure mix of rubber maker's sulfur, zinc stearate, and carbon black, said cure mix filling interstices between and adhering to the scrap rubber ingredients.

7. The rigid sheet material of claim 6 further comprising scrap synthetic and/or textile scrap material as part of the mixture.

8. The rigid sheet material of claim 6 further comprising glass fiber mesh as part of the mixture.

9. The rigid sheet material of claim 6 further comprising metal mesh as part of the mixture.

10. The rigid sheet material of claim 6 further comprising glass fiber strands of random lengths as part of the mixture.

* * * * *